March 31, 1925.

B. F. KOEPSELL 1,531,956

COMBINED PERCH AND NEST HOUSE

Filed March 22, 1924   3 Sheets-Sheet 1

B. F. Koepsell, INVENTOR.

BY Geo. P. Kimmel, ATTORNEY.

March 31, 1925.
B. F. KOEPSELL
1,531,956
COMBINED PERCH AND NEST HOUSE
Filed March 22, 1924　　3 Sheets-Sheet 2
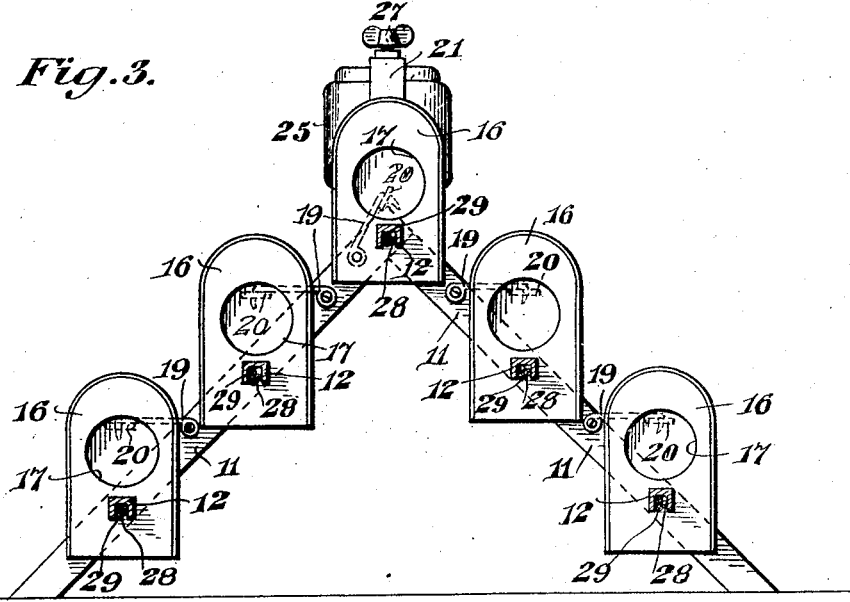
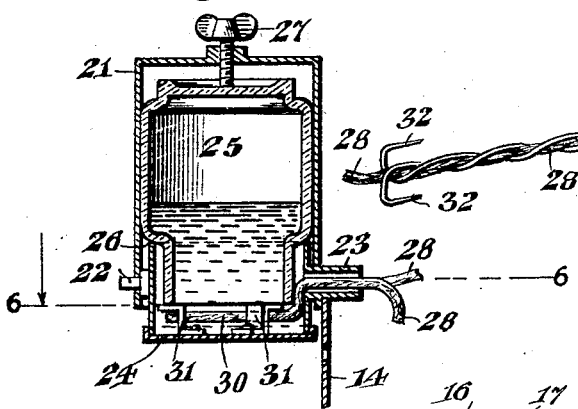
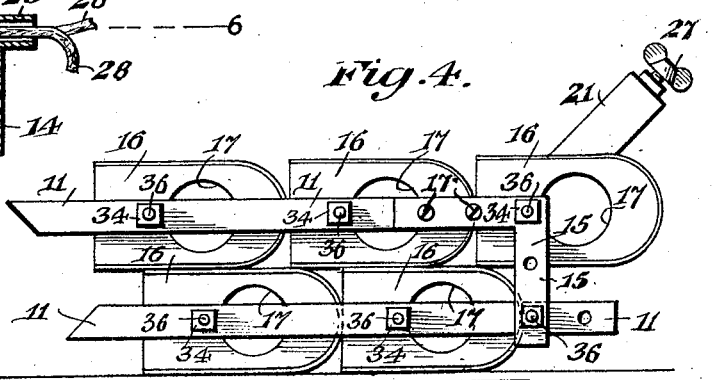
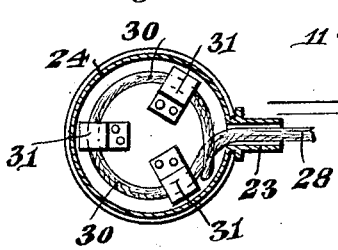
B. F. Koepsell, INVENTOR.
BY Geo. P. Kimmel, ATTORNEY.

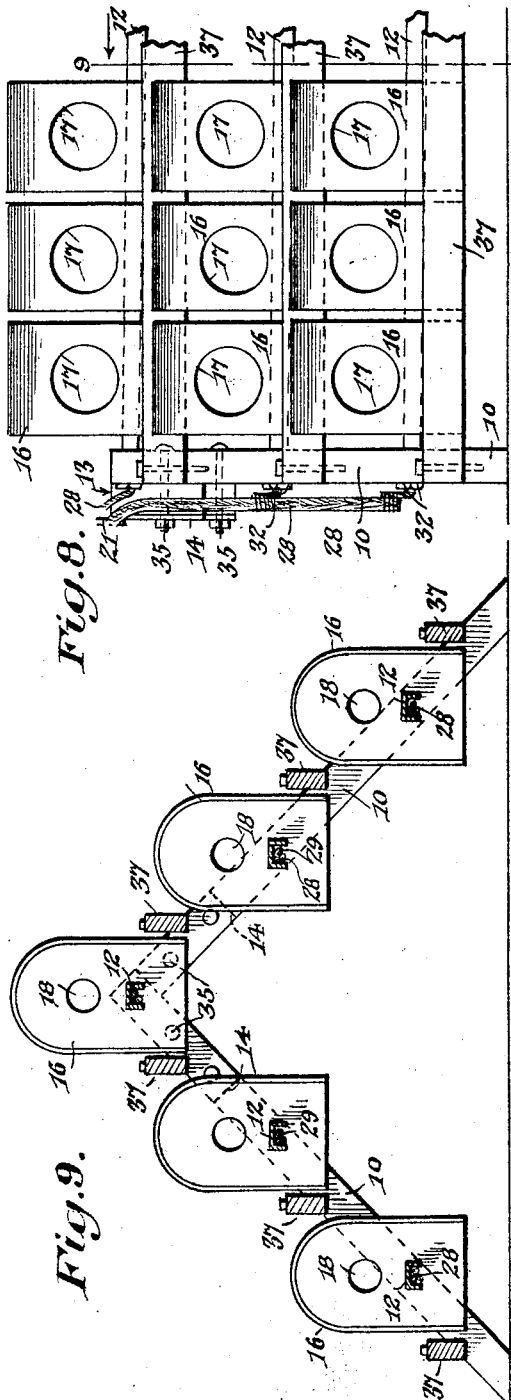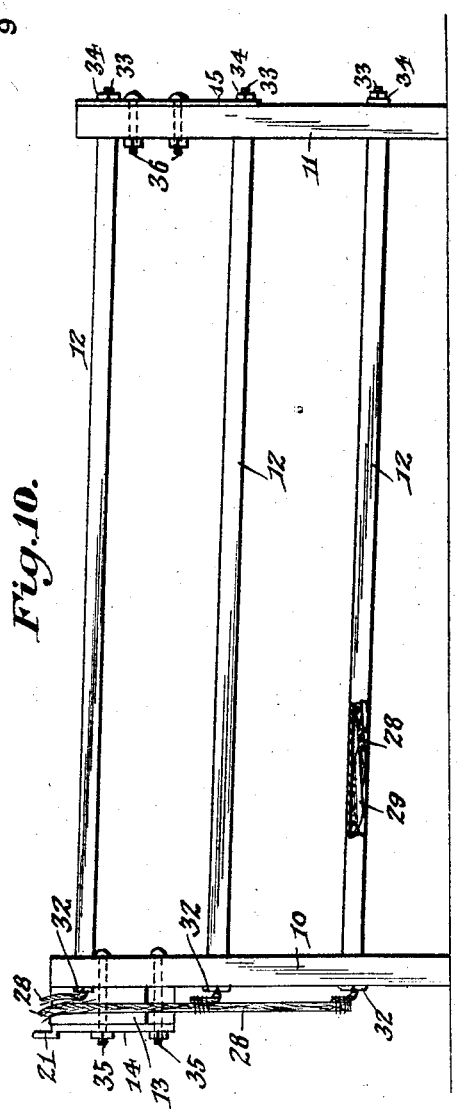

Patented Mar. 31, 1925.

1,531,956

UNITED STATES PATENT OFFICE.

BERNARD F. KOEPSELL, OF WORTHINGTON, MINNESOTA.

COMBINED PERCH AND NEST HOUSE.

Application filed March 22, 1924. Serial No. 701,097.

*To all whom it may concern:*

Be it known that I, BERNARD F. KOEPSELL, a citizen of the United States, residing at Worthington, in the county of Nobles and State of Minnesota, have invented certain new and useful Improvements in Combined Perches and Nest Houses, of which the following is a specification.

This invention relates to combined sanitary nests and perches for fowls, and has for one of its objects to provide a simply constructed device whereby the fumes from a deodorizing, disinfecting and vermin destroying element may be uniformly and continuously distributed throughout the perches and thence to the fowls upon the perches and without any part of the fowls coming in contact with the vermin destroying element.

Another object of the invention is to provide a device of this character, which may be extended to any required capacity, and folded or collapsed to occupy less space when not in use or when being transported, shipped or stored.

Another object of the invention is to provide a device of this character having a nest house associated with each perch, and level therewith to faciliate the passage of the fowls between the nest and the perches, and rotatable on the perches to faciliate the cleansing or sanitation of the nests.

Another object of the invention is to provide a device of this character, having improved means of producing and controlling the flow of the disinfecting and vermin destroying element from the source of supply to the perches.

Another object of the invention is to provide a device of this character, having improved means for conducting the vermin destroyer element from the source of supply to the perches, and to control the tension of the conducting means.

Another object of the invention is to provide a device of this character having an improved construction of holder for the disinfecting element, and controlling the flow therefrom.

With these and other objects in view the invention consists in certain novel features of construction as hereinafter shown and described and then specifically pointed out in the claims, and in the drawings illustrative of the preferred embodiment of the invention.

Figure 3 is a transverse section on the line 3—3 of Figure 2, looking in the direction of the arrow.

Figure 4 is an end elevation of the device when folded or collapsed for shipment or storage.

Figure 5 is an enlarged sectional elevation of the automatic supply tank for the disinfecting liquid.

Figure 6 is a transverse section on the line 6—6 of Figure 5.

Figure 7 is a perspective detail detached of one of the disinfectant conducting devices.

Figure 8 is a front elevation of a part of the improved device, illustrating a modification in the construction.

Figure 9 is a section on the line 9—9 of Figure 8.

Figure 10 is a front elevation, illustrating another modification in the construction.

The improved device comprises in general supporting frames hingedly united and each including a plurality of perches for fowls arranged in parallel relation, and with a conductor for a disinfecting and vermin destroying element attached to the under side of each perch. The improved device likewise includes a tank or container for the supply of the disinfectant and with means for automatically feeding the disinfectant to the conductor devices.

Figure 1:
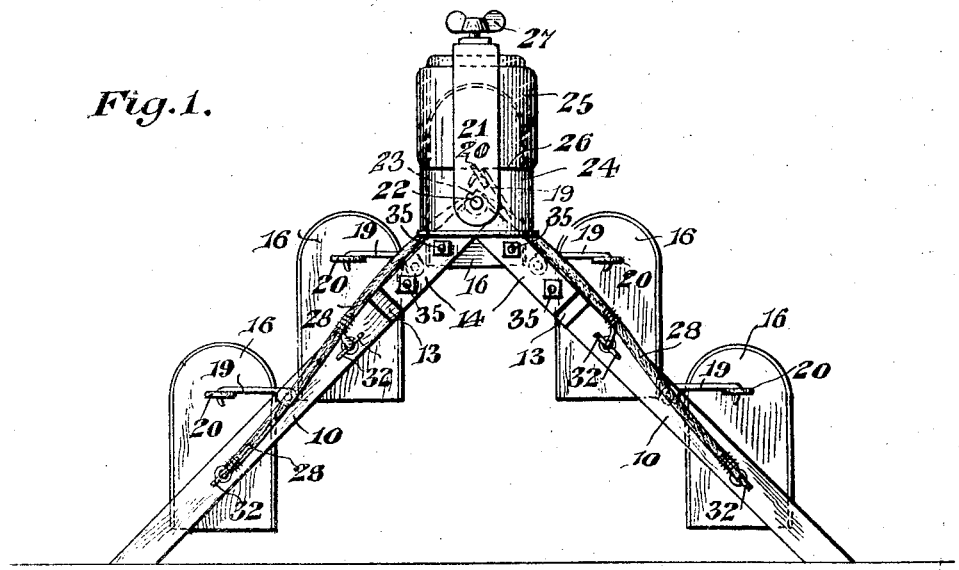
Figure 1 is an end elevation of the improved device in operative position.
Figure 2:
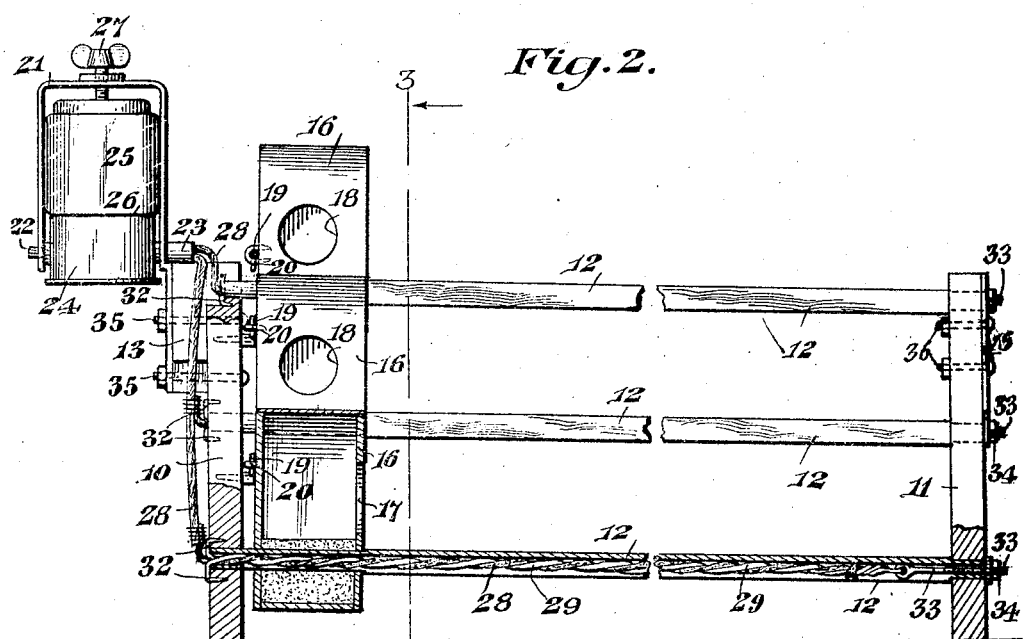
Figure 2 is a side elevation, partly in section of the parts arranged as shown in Figure 1.

In the form of construction shown in Figures 1, 2, and 3 a nesting house is associated with each perch and movable to enable the nests to be overturned for cleansing and sanitation.

The improved device may be of any size and with any required number of perches and nest houses, when the latter are employed, but for the purpose of illustration a frame containing five of the perches and each with one nest house associated therewith is shown in Figures 1, 2, 3 and 4.

Each supporting device comprises end members 10 and 11 and connecting perches or roosts 12, the latter fixedly attached at the ends in the members 10 and 11. The confronting ends of the frame members 10 are provided respectively with extension blocks 13, and the blocks united, preferably at right angles to each other, by clip devices 14, while the confronting ends of the frame members 11 are similarly coupled by like right angled clip devices 15.

In the structure shown in Figures 1 and 2 one end of each perch, for illustration the end nearest to the frame members 10, is rounded, and mounted for rotation on each rounded portion is a nest house 16, each nest house being mounted near one end upon the perch and each provided with a relatively large opening 17 next to the perch, to provide convenient passage for the fowl to and from the nest to the perch. Each nest house is also provided with a smaller opening 18 in one side to provide the requisite ventilation and also to provide means for convenient cleaning and disinfecting the nest houses.

In the form of structure shown in Figures 1 and 2 each nest house and the adjacent frame members 10 are also provided with a hook 19 and staple 20, to hold them in fixed relation with the nest houses in upright position when in use, and to enable them to be overturned when required for cleansing or disinfection.

The clip device 14 is formed with an upwardly directed inverted U-shaped extension frame 21, and journalled at 22 and 23 in the frame near the lower part is a cup shaped member 24. A receptacle 25 open at one end is reduced toward its open end and disposed by its reduced open end within the frame 21 with the shoulder 26 formed at the juncture of the body of the receptacle and the reduced portion forming a stop shoulder which bears upon the upper rim of the cup 24, as shown more particularly in Figure 5.

The frame 21 is provided with a clamp screw 27 whereby the receptacle 25 may be held in position substantially liquid tight upon the cup member 24, and readily detached, when required, for recharging, or for other purposes.

The lower sides of the perches 12 are longitudinally channelled, as shown in Figures 2, 3, 8 and 9 to receive a conductor element through which a disinfecting and vermin destroying substance or material may be caused to flow by capillary attraction or force. The conductor element is a cord of a loose fabric indicated at 28 intertwined with a wire of noncorrosive metal and indicated at 29.

The frame members 10 and 11 are so constructed that the perches are slightly inclined away from the tank end, to cause the liquid to flow more freely, as shown in Figures 2 and 10.

The journal 23 of the cup 24 is tubular, and each of the fabric portions 28 of the conductor leads at one end through the tubular journal and are united in a coil 30 in the bottom of the cup 24, as shown in Figures 5 and 6, the coils being retained in position by suitable clip devices 31.

The wire reinforce members 29 extend only within the channels in the perches and each formed with hooks 32 at one end to be forced into the members 10, as shown in Figure 2, to anchor the wires at one end, and each reinforcing member provided at the other end with a straining screw 33 and nut 34 operating through the members 11, to apply longitudinal strain to the wire members, to retain them and the fabric conductors in position within the channels of the perches.

The body portion or tank 25 is charged with the disinfecting or antivermin or insecticide liquid and inverted over the cup 24 and secured in place as above described, and the liquid will fill the cup and be absorbed by the fabric conductors and carried thence by capillary force the whole lengths of all the perches, and the fumes rise in contact with the fowls when on the perches and effectually destroy the vermin within their feathers, while at the same time the fabric conductors being embraced wholly within the channels in the lower sides of the perches, the feet or other parts of the fowls do not come in direct contact with the liquid being carried through the conductors.

The clip devices 14 are connected by two bolts 35 to one of the frame members 10, while the clip devices 15 are likewise coupled by two bolts 36 to one of the frame members 11.

By this arrangement when the bolts are all in place, the frame members with their perches and tanks attached will be rigidly supported in triangular shape as shown in Figures 1 and 3, and when one of the bolts 35 and one of the bolts 36 are detached, the frames and perches together with their nest houses, can be collapsed into the shape shown in Figure 4, for convenience in shipment or storage.

The nest houses may be entirely of metal or partly metal and partly of wood, as may be required.

In Figure 8 a plurality of the nest houses 16 are shown upon each perch, and in this modified construction a bar 37 extends between each pair of the series of nest houses and are connected at the ends to the end frame members 10 and 11.

In this modified construction the openings 17 for the entrance of the fowls are in one side of each nest house while the ventilating openings 18 are in one end, the bars 37 operating as perches or foot rails, on which the fowls alight in entering or leaving the nest houses.

In the modified structure shown in Figures 8 and 9, the fumes from the disinfecting substance pass directly into the nest houses.

In Figure 10 another modification in the construction is shown, in which the nest houses are dispensed with.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

1. A perch having a longitudinally directed channel in its lower side, a conductor element within said channel capable of causing a liquid to flow therethrough by capillary force, a metal reinforcing member intertwined with said conductor, a means for attaching said reinforcing member at one end to said perch, and means for applying strain longitudinally of the same.

2. In a perch for fowls, a conductor element extending longitudinally of the perch capable of causing a liquid to flow therethrough by capillary force, a metal reinforcing member intertwined with said conductor, means for attaching said reinforcing member at one end to the perch and means attached to the reinforcing member at the other end for applying strain longitudinally of said reinforcing member.

3. A device of the class described including a perch for fowls, a conductor element extending longitudinally of the perch and capable of causing a liquid to flow therethrough by capillary force, a metal reinforcing member intertwined with said conductor, means for attaching said reinforcing member at one end to the perch, means attached to the reinforcing member at the other end for applying strain longitudinally of said reinforcing member, and a tank for a liquid and into which said conductor element leads.

4. A device of the class described, including a perch for fowls, a nest house movably engaged with said perch and accessible from the perch, a conductor element extending longitudinally of the perch and capable of causing a liquid to flow therethrough by capillary force, a metal reinforcing member intertwined with said conductor, and means for applying strain longitudinally of said reinforcing member.

5. A device of the class described comprising frame members in spaced relation, a plurality of perches rigidly connected at the ends in spaced parallel relation to said frame members, a nest housing movably associated with each of said perches and each with an opening providing for passage between the nest house and perch, means for locking said nest house relative to said frame members and perch, a conductor capable of causing liquid to flow therethrough by capillary force, a metal reinforcing member intertwined with each of said conductor members, and means for applying strain longitudinally to said reinforcing member.

6. An apparatus of the class described comprising supporting end frames each including coacting members in spaced relation and connected by a plurality of perches in parallel relation, means for detachably uniting said frame members for collapsing into parallel relation, a nest house movably supported relative to each of said perches, a conductor extending longitudinally of each perch and capable of causing a liquid to flow therethrough by capillary force, and a metal reinforcing element intertwined with each conductor.

7. An apparatus of the class described, comprising supporting frames each including end members in parallel relation and connecting perches in spaced relation, angular clips detachably coupling said end frame members, whereby they may be folded into small space for transportation or storage, a nest housing movably associated with each of said perches, and means for locking said nest houses in fixed relation respectively with said frame members and perches.

In testimony whereof, I affix my signature hereto.

BERNARD F. KOEPSELL.